(12) United States Patent
Lee et al.

(10) Patent No.: US 9,597,830 B2
(45) Date of Patent: Mar. 21, 2017

(54) METHOD FOR MANUFACTURING HYDROPHILIZED HOLLOW FIBER MEMBRANE BY CONTINUOUS PROCESS USING EXTRUDER

(71) Applicant: LG ELECTRONICS INC., Seoul (KR)

(72) Inventors: Junseok Lee, Seoul (KR); Sumin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 178 days.

(21) Appl. No.: 14/434,915

(22) PCT Filed: Mar. 29, 2013

(86) PCT No.: PCT/KR2013/002611
§ 371 (c)(1),
(2) Date: Apr. 10, 2015

(87) PCT Pub. No.: WO2014/112689
PCT Pub. Date: Jul. 24, 2014

(65) Prior Publication Data
US 2015/0266222 A1    Sep. 24, 2015

(30) Foreign Application Priority Data
Jan. 21, 2013 (KR) .................. 10-2013-0006708

(51) Int. Cl.
| | | |
|---|---|---|
| B29C 44/22 | (2006.01) | |
| D01D 5/08 | (2006.01) | |
| D01D 5/24 | (2006.01) | |
| D01D 5/247 | (2006.01) | |
| D01F 6/48 | (2006.01) | |
| B29C 47/00 | (2006.01) | |
| B01D 67/00 | (2006.01) | |
| B01D 69/12 | (2006.01) | |
| B01D 69/08 | (2006.01) | |
| B01D 69/02 | (2006.01) | |
| B01D 71/34 | (2006.01) | |
| B29K 27/00 | (2006.01) | |
| B29L 23/00 | (2006.01) | |
| B29L 31/00 | (2006.01) | |

(52) U.S. Cl.
CPC ...... B29C 47/0023 (2013.01); B01D 67/0006 (2013.01); B01D 67/0016 (2013.01); B01D 69/02 (2013.01); B01D 69/08 (2013.01); B01D 69/087 (2013.01); B01D 69/125 (2013.01); B01D 71/34 (2013.01); B01D 2323/02 (2013.01); B01D 2325/36 (2013.01); B29C 47/0057 (2013.01); B29C 47/0066 (2013.01); B29K 2027/16 (2013.01); B29L 2023/003 (2013.01); B29L 2031/755 (2013.01)

(58) Field of Classification Search
CPC ............ B01D 67/0006; B01D 67/0016; B01D 69/08; B01D 69/087; B01D 69/125; B01D 71/34; B01D 2323/02; B01D 2325/36; B29C 44/22; D01D 5/08; D01D 5/24; D01D 5/247; D01F 6/48
USPC ........... 264/41, 45.5, 45.9, 68, 209.1, 209.6, 264/211.24, 557, 558, 559, 561, 562
See application file for complete search history.

(56) References Cited

U.S. PATENT DOCUMENTS

| | | | | |
|---|---|---|---|---|
| 4,001,368 A | * | 1/1977 | Michizoe | ............ B29C 47/0004 264/209.6 |
| 5,158,721 A | * | 10/1992 | Allegrezza, Jr. | ... B01D 67/0006 264/41 X |
| 6,039,872 A | * | 3/2000 | Wu | ..................... B01D 67/0006 210/500.35 |
| 2008/0214687 A1 | | 9/2008 | Muller et al. | |
| 2009/0101600 A1 | | 4/2009 | Shiki et al. | |
| 2011/0253621 A1 | | 10/2011 | Kim et al. | |

FOREIGN PATENT DOCUMENTS

| | | |
|---|---|---|
| CN | 1669624 A | 9/2005 |
| CN | 1680007 A | 10/2005 |
| CN | 101269302 A | 9/2008 |
| CN | 101874992 A | 11/2010 |
| CN | 101920173 A | 12/2010 |
| JP | 2010-094670 A | 4/2010 |
| KR | 10-2008-0033279 A | 4/2008 |
| KR | 10-2008-0089476 A | 10/2008 |
| KR | 10-2010-0114808 A | 10/2010 |
| KR | 10-2011-0052244 A | 5/2011 |
| KR | 10-2011-0115856 A | 10/2011 |

* cited by examiner

*Primary Examiner* — Leo B Tentoni
(74) *Attorney, Agent, or Firm* — Birch, Stewart, Kolasch & Birch, LLP (57) ABSTRACT

The present invention relates to a method of manufacturing a hydrophilized hollow fiber membrane by a continuous process using an extruder. According to the method of the present invention, thermal curing agent in the form of a monomer or a oligomer is added to a polymer solution, and in the melt state before a separation membrane is manufactured, thermal polymerization occurs due to an initial reaction of a thermal initiator at the appropriate temperature within a cylinder of the extruder. Thus, a hydrophilic component is evenly distributed into the membrane at the micro-level, and the hydrophilic component is not washed out, resulting in very high stability. Another advantage is high economic value and efficiency because the process for hydrophilizing the membrane as well as the process for manufacturing the membrane is carried out by the continuous process using the extruder without using conventional extrusion equipment in the form of an agitator.

12 Claims, 6 Drawing Sheets

METHOD FOR MANUFACTURING HYDROPHILIZED HOLLOW FIBER MEMBRANE BY CONTINUOUS PROCESS USING EXTRUDER

TECHNICAL FIELD

The present invention relates to a method of manufacturing a hydrophilized hollow fiber membrane by a continuous process using an extruder.

BACKGROUND ART

A separation membrane used in separating gas, liquid or solid, particularly a specific component such as an ion material has been designed to have selectivity to a material which is removed and simultaneously allow a material which is permeated to pass with low resistance by appropriately combining a dense structure and a porous structure in order to selectively permeate or eliminate specific components.

Recently, a technology using a separation membrane having the structure has been frequently applied even to a process of purifying water and treating wastewater. These separation membranes are classified into a polymer membrane, a ceramic membrane, a metal membrane, and an organic/inorganic composite membrane according to the material, and are divided into micro-filtration (MF), ultra-filtration (UF), nano-filtration (NF), and reverse osmosis (RO) membranes according to the performance.

Meanwhile, in a method for manufacturing a separation membrane using a polymer resin as a material, a non-solvent induced phase separation method is generally used, in which a polymer solution including a good solvent and a pore-forming agent is cast and extrusion-spun at low temperature, in which phase separation by heat does not occur, to solidify a polymer resin in a non-solvent, and thus form a porous structure. The non-solvent induced phase separation method has an advantage in that the size of pores may be freely adjusted, but there is a disadvantage that when finger-like macrovoids are formed, mechanical strength of a separation membrane is so weak that the membrane is broken during the operation.

As another method, a thermally induced phase separation method is a method for manufacturing a separation membrane by spinning a polymer resin at a temperature in which the phase separation occurs or at a higher temperature, and cooling and solidifying the polymer resin, and it is general to exhibit a spherical structure by a crystal of the polymer, particularly, spherulite. In the thermally induced phase separation method, there is an advantage in that a separation membrane with a strong mechanical strength is easily manufactured, but it is difficult to make the pore size so small as the size of an ultra-filtration membrane.

For the separation membrane by the non-solvent or thermally induced phase separation method, a separation membrane has been manufactured by melting and mixing a polymer resin, a solvent, and an additive using an equipment in the form of a reactor with an agitator; removing bubbles; and then performing extrusion under pressure of nitrogen or a gear pump. However, there are disadvantages that it takes a lot of time to melt the polymer and perform a stabilization process of removing bubbles; it is difficult to extrude a polymer melt having high viscosity; and that if the extruding and spinning is carried out at a high temperature, it is difficult to manage the process, for example the temperature of lines connected to nozzle must be controlled.

Recently, there have been attempts in the industrial fields to manufacture a separation membrane using an extruder such that these disadvantages are alleviated and a continuous process is achieved. However, in order to melt a polymer pellet or powder in advance, the temperature needs to be increased to a melting point of the polymer or higher, and it is difficult to control the thermally induced phase separation during the process of cooling the polymer solution to a room temperature.

Meanwhile, in a separation membrane generally used in water treatment, contaminants are adsorbed and grown on the surface of the membrane while the separation membrane filters the contaminated original water, thereby generating contamination on the surface of the membrane. The aggravation of the separation membrane contamination increases the water permeation pressure and gradually decreases production quantities, thereby ultimately reducing the filtration function of the separation membrane. In order to control contamination of the separation membrane, cleaning is performed using chlorine-based materials and acids and alkalis. However, since this shortens the lifespan of the separation membrane, a polyvinylidene fluoride-based resin, which is a material with high chemical resistance, has recently been used, or studies on hydrophilizing the separation membrane have been conducted in order to reduce contamination of a hydrophobic material such as protein.

A polyvinylidene fluoride (PVDF) separation membrane manufactured by a typical process is vulnerable to contamination because its surface is hydrophobic. As a general hydrophilization method to prevent this problem, a surface modification or coating method has often been used in the post-treatment process. However, in this case, there is a problem in uniformity and durability of the surface.

Further, there is a method of blending hydrophilic polymers when preparing a polymer solution. In this case, the productivity is good, but most of the hydrophilic polymers have bad compatibility with polyvinylidene fluoride, and thus it is difficult to have a uniform distribution in a micro scale within the separation membrane. In addition, lots of the hydrophilic polymers are dissolved out from the membrane in the process of washing/extracting with water or other solvents for removing excessive solvent after the phase separation. Furthermore, even if the hydrophilic polymers are remained in the final membrane, they are dissolved out from the membrane into water over a long period of time of using, thereby causing harms to the human body.

In this regard, Korean Patent Application Laid-Open 10-2008-0033279 describes a method of cross-linking hydrophilic components to polyvinylidene fluorides by manufacturing a membrane from a polymer blend containing hydrophilic components such as PVP and heating and/or applying radiation to the membrane manufactured in order to solve the problem that the hydrophilic components are easily dissolved out to water and improve the hydrophilic stability.

However, this method cross-links the hydrophilic components after the hollow fiber membrane is completely manufactured, and thus still has a problem that the hydrophilic polymers having bad compatibility cannot uniformly distributed in a micro-scale within the polyvinylidene fluoride separation membrane, and that the cross-linking reaction also occurs in a limited manner. Furthermore, in the method, a subsequent process of cross-linking the hydrophilic components is required after the completion of the membrane synthesis after wetting so that the productivity is low and it takes a lot of time to carry out the method. Therefore, there is need for consideration of a novel method which may maintain durability along with uniformity and achieve a continuous process for a high productivity.

Throughout the present specification, a plurality of papers and patent documents are referenced, and citations thereof are indicated. The disclosure of each of the cited papers and patent documents is incorporated herein by reference in its entirety to describe the level of the technical field to which the present invention pertains and the content of the present invention more apparently.

SUMMARY OF INVENTION

The present inventors have endeavored to develop a method for hydrophilizing a hollow fiber membrane, which may increase the productivity by a continuous process simultaneously while securing the uniformity, high stability, and durability of hydrophilic components. As a result, the present inventors have adopted a continuous process using an extruder instead of a method of using a conventional agitator, added a thermal curing agent in the form of a monomer or an oligomer to a polymer solution to cause a thermal polymerization due to an initial reaction of thermal initiator at the appropriate temperature within a cylinder of the extruder in the melt state before a separation membrane is manufactured, so that a hollow fiber membrane in which the hydrophilic component is evenly formed within the membrane is manufactured, thereby completing The present invention.

Therefore, an aspect of the present invention is to provide a method of manufacturing a hydrophilized hollow fiber membrane by a continuous process using an extruder.

The other objects and advantages of the present invention will be more apparent from the following detailed description, claims and drawings of the invention.

To achieve these and other advantages and in accordance with the purpose of the present invention, as embodied and broadly described herein, there is provided a method of manufacturing a hydrophilized hollow fiber membrane by a continuous process using an extruder, the method including: (i) supplying a polyvinylidene fluoride (PVDF)-based resin, a hydrophilic resin, a thermal curing agent, and a thermal initiator to an extruder; (ii) mixing and melting the supplied materials to a melt by the cylinder temperature of the extruder and the rotation of a screw; (iii) polymerizing the thermal curing agent in the melt, wherein the polymerization begins by initiating the thermal initiator using heat generated from temperature of the cylinder and rotation of the screw; and (iv) extruding and spinning the melt in which the thermal curing agent is being polymerized.

The present inventors have developed a continuous process using an extruder without using conventional extrusion equipment with an agitator, and since the method of the present invention is performed by a continuous process from the manufacture and formation of a separation membrane until the hydrophilization process, the productivity is very good and the hydrophilic component is uniformly distributed in a micro scale level in the membrane, and thus, the uniformity and stability thereof is very high. Hereinafter, each step of the method of the present invention will be described in detail.

(i) Supplying Polyvinylidene Fluoride (PVDF)-Based Resin, Hydrophilic Resin, Thermal Curing Agent, and Thermal Initiator to Extruder Among the components, as a first polymer resin, polyvinylidene fluoride (PVDF)-based resin having a weight average molecular weight of 250,000 to 400,000 may be used in an amount of 20 to 40 wt %, more specifically 20 to 35 wt % based on the total composition. When the content of the PVDF resin is less than 20 wt %, the strength of the hollow fiber membrane may be weakened, and when the content is more than 40 wt %, the concentration of the polymer solution is so high that there may be a problem in molding a hollow fiber separation membrane having a small pore size.

Polyvinylidene fluoride (PVDF) may be placed into a dehumidifying dryer at a drying temperature of 40 to 90° C. and dried before being supplied, together with a hydrophilic resin to be described below, to an extruder.

Among the components, the hydrophilic resin is mixed together in order to make up for low compatibility of a polyvinylidene-based resin with water and serve a function as a pore-forming agent, and here, the hydrophilic resin means a polymer resin having a polar or charged functional group so as to have compatibility with water.

In an exemplary embodiment, as the hydrophilic resin, it is possible to use polyvinyl pyrrolidone (PVP), polyethylene glycol (PEG), an acrylamide resin, an acryl-based resin, an amine-based resin such as allylamine, ethyleneimine, and oxazoline, polyetherimide (PEI), polyimide (PI), polyamide (PA), cellulose acetate (CA), and the like, and examples thereof are not limited thereto.

The hydrophilic resin may be included in an amount of 20 to 60 wt %, and more specifically in an amount of 30 to 50 wt %, based on the first polymer resin. Here, when the content of the hydrophilic resin is less than 20 wt %, porosity of the separation membrane may be too low, and when the content is 60 wt % or more, the porosity thereof becomes so high that there may be a problem that the strength is weakened.

In a preferred exemplary embodiment, as the hydrophilic resin, polyvinyl pyrrolidone (PVP) and/or polyethylene glycol may be used, and it is possible to use a polyvinyl pyrrolidone (PVP) having an average molecular weight of 6,000 to 80,000 and a polyethylene glycol having an average molecular weight of 200 to 600.

Among the components, the thermal curing agent is used in order to impart additional hydrophilic characteristics to the polyvinyl pyrrolidone-based separation membrane and may be thermally polymerized, and it is possible to use an acryl-based monomer or oligomer as a curing agent, or a non-acryl-based curing agent, which is a material exhibiting hydrophilic characteristics when thermally hardened, in an amount of 5 to 50 wt % based on the total polymer solution.

In the process of mixing and melting the supplied polymer resins by the screw rotation of the cylinder, the temperature within the cylinder increases and reaches the temperature for initiation reaction of the initiator, and then the curing agent monomers or oligomers are polymerized with each other to form a polymer network or a droplet form, or graft-polymerized to the first polymer resins or the hydrophilic polymer resins. If the curing agent monomers or oligomers are graft-polymerized to the hydrophilic polymer resins, not only the polymer itself obtained from the polymerization of the curing agent monomers or oligomers imparts hydrophilicity to the separation membrane, but also the polymer of the curing agent monomers or oligomers attaches to the hydrophilic polymer resins and prevent the hydrophilic polymer resins from being washed out by the solvent from the separate membrane.

As for the curing agent as a monomer form, it is possible to use a mono-functional compound, for example one or more selected from a hydroxyalkyl acrylate-based compound such as butyl acrylate (BA), 2-ethylhexyl acrylate (2EHA), octyl/decyl acrylate (ODA) and 2-hydroxyethyl acrylate (HEA), 2-hydroxypropyl acrylate (HPA), 4-hydroxybutyl acrylate (HBA), and 2,3-dihydroxypropyl acrylate, nonylphenol ethoxylate monoacrylate (MNPEOA), isobornyl acrylate (IBOA), beta-carboxyethyl acrylate (b-CEA), tetrahydrofurfuryl acrylate (THFFA), cyclohexyl acrylate (CHA), alkylated cycloalkyl acrylates, dicyclopentenyl acrylate (DCPA), dicyclopentenyl oxyethyl acrylate (DCPEOA), propylene glycol monoacrylate (MPPGA), propylene glycol methacrylate (MPPGMA), 2-(2-ethoxyethoxy) ethyl acrylate (EOEOEA), 2-hydroxypropyl methacrylate (HPMA), and 2-hydroxyethyl methacrylate (HEME). In addition a non-acryl-based compound monomer such as vinyl acetate and N-vinyl pyrrolidone may be used.

A polyfunctional monomer having 2 to 4 functional groups may also be used. For example it is possible to use a di-functional monomer such as butanediol diacrylate (BDDA), butylene glycol dimethacrylate (BGDMA), hexanediol diacrylate (HDDA)/dimethacrylate (HDDMA), butylene glycol dimethacrylate (BGDMA), neopentyl glycol diacrylate (NPGDA), ethylene glycol dimethacrylate (EGDMA), diethylene glycol diacrylate (DEGDA)/dimethacrylate (DEGDMA), triethylene glycol diacrylate (TEGDA)/dimethacrylate (TEGDMA), tetraethylene glycol diacrylate (TTEGDA)/dimethacrylate (TTEGDMA), polyethylene glycol diacrylate (PEGDA)/dimethacrylate (PEGDMA), dipropylene glycol diacrylate (DPGDA), tripropylene glycol diacrylate (TPGDA), ethoxylated/propylated neopentyl glycol diacrylate (NPEOGDA)/(NPPOGDA), and allyl methacrylate (ALMA); a tri-functional monomer such as trimethylolpropane triacrylate (TMPTA)/trimethacrylate (TMPTMA), pentaerythritol triacrylate (PETA), ethoxylated propoxylated trimethylpropane triacrylate (TMPEOTA)/(TMPPOTA), glyceryl/propoxylated triacrylate (GPTA)/(GPPOTA), tris(2-hydroxyethyl) isocyanurate triacrylate (THEICTA), allyl acrylate, allyl ether; a tetra-functional monomer such as pentaerythritol tetraacrylate (PETTA), dipentaerythritol pentaacrylate (DPEPA), and the like.

As an oligomer form, it is possible to use a hydroxyalkyl acrylate-based oligomer such as a HEA oligomer and a HPA oligomer, epoxy acrylate-based, polyester acrylate-based, urethane acrylate-based, polyether acrylate-based, silicone acrylate-based, polybutadiene acrylate-based oligomers, and the like.

Among the components, the thermal initiator serves to enable radical polymerization, and may be used either alone or in mixture according to the temperature, and it is possible to use a peroxide-based material such as benzoyl peroxide (40 to 100° C.), dilauryl peroxide (50 to 100° C.), di-tert-butyl peroxide (80 to 150° C.), cumyl hydroperoxide (50 to 120° C.) and hydrogen peroxide (30 to 80° C.), and potassium persulfate (30 to 80° C.), and an azo compound-based material such as azobisacrylonitrile (50 to 70° C.), diisopropyl diazene (180 to 200° C.), and dimethyl diazene (azomethane, 225 to 250° C.), but examples thereof are not limited thereto.

The thermal initiator may be used in an amount of 3 to 7 wt % based on the thermally polymerizable material.

In addition to the specified components, an appropriate solvent (good solvent and/or poor solvent), a nucleating agent, additives for the purpose of imparting porous properties, strength, and other functionalities, and the like may be supplied together to the extruder.

Among these components, the polymer resin component may also be supplied through an extruder hopper after being mixed with a polyvinylidene fluoride-based resin and dried, and the solvent (good solvent and/or poor solvent), a polymer resin having a small molecular weight, such as polyethylene glycol (PEG), the additive nucleating agent, and the like may also be supplied to the extruder through a liquid pump together with a thermal curing agent and a thermal initiator.

When the nucleating agent is added for controlling the spherical structure, the amount of nucleating agent added may be less than 0.2 wt % based on the polyvinylidene fluoride-based resin which is the first polymer resin, and specifically less than 0.15 wt %.

The available nucleating agent may vary depending on the crystal temperature, but examples thereof include adipic acid, salicylic acid, benzoic acid, monochloroacetic acid, citric acid, stearic acid, oleic acid, oxalic acid, and the like, but are not limited thereto.

(ii) Mixing and Melting Supplied Materials by Cylinder Temperature of Extruder and Rotation of Screw All the processes of mixing materials for manufacturing a membrane are performed in a screw within the cylinder of the extruder. A single-screw extruder may be used, but a twin-screw extruder is also preferably used in order to increase the mixing efficiency.

In an exemplary embodiment, the extruder may include ten cylinders, the temperate may be adjusted for each cylinder, and the temperature for each cylinder may be adjusted within 50 to 250° C. in consideration of the melting point of the polymer resin and the initiation temperature of the thermal initiator.

The configuration of the segment of the screw may be optimized in order to increase the mixing efficiency, and for example, the rotation speed of the screw may be adjusted to 150 to 300 rpm. In this case, the supplied materials are simultaneously molten while being mixed by the temperature of the cylinder and the rotation of the screw.

(iii) Initiating Thermal Initiator Using Heat Generated from Cylinder Temperature and Rotation of Screw and Polymerizing Thermal Curing Agent in Melt In the process where the polymer resins supplied to the extruder is mixed and molten by rotation of the screw within the cylinder, the temperature within the cylinder increases and reaches the temperature for initiation reaction of the initiator, and then the curing agent monomers or oligomers are polymerized to form a polymer which is hydrophilic itself. It is preferred that the polymerization of thermal curing agent is initiated after uniform liquid phase is formed at the temperature over the melting point of the polymer resins.

According to the method of polymerizing the curing agent in the melt, the method of the present invention may be classified into a first hydrophilization manufacturing method and a second hydrophilization manufacturing method, and in the first hydrophilization manufacturing method, a curing agent monomer or oligomer is polymerized in a melt to form a polymerization network or a droplet with each other. The thusly formed curing agent polymer polymerization network or droplet is itself a hydrophilic polymer, and thus imparts additional hydrophilicity to the separation membrane, and the polymerization process occurs in the melt state before the separation membrane is formed, thereby allowing the hydrophilic component to be evenly distributed in a microscale level over the entire separation membrane.

In the second hydrophilization manufacturing method, the curing agent monomers or oligomers are graft-polymerized to the first polymer resins or the hydrophilic polymer resins. When the curing agent monomers or oligomers are graft-polymerized to the hydrophilic polymer resins, not only the curing agent polymer itself impart hydrophilicity to the separation membrane, but also it serves to prevent the hydrophilic polymer resins to which the curing agent polymer is attached from being washed out by the solvent, thereby securing much better hydrophilicity. The second hydrophilization manufacturing method also has an advantage in that the hydrophilic components are evenly distributed in a micro-scale level over the entire separation membrane.

In a case where a curing agent is included as a hydrophilicity imparting agent in the first hydrophilization process, it is preferred that an acryl-based materials of which polymerization can be initiated by a thermal initiator are included in an amount of 5 to 50 wt % based on the total polymer solution, and the thermal initiator is included in an amount of 0.3 to 1 mole based on 100 mole of the polymerizable materials.

(iv) Extruding and Spinning Melt in which Thermal Curing Agent is being Polymerized This is a step of extruding and spinning the mixed and molten polymer solution. The polymer solution mixed and molten by the temperature of the cylinder and rotation of the screw in which the curing agent is being polymerized by the thermal initiation is transferred to a gear pump, and then the polymer solution may be extruded and spun through the nozzle by the metered gear pump. Preferably, the mixed solution may be extruded together with an internal coagulating solution.

The method of the present invention may further comprise cooling and solidifying the extruded and spun solution in a coagulation bath in addition to the above-described steps of (i) to (iv).

As the internal coagulating solution and for the coagulation bath, a poor solvent or a mixture of poor and good solvents in water may be used.

In an exemplary embodiment, as a good solvent, it is possible to use dimethylformamide (DMF), n-methyl-2-pyrrolidone (NMP), dimethylacetamide (DMAc), dimethyl sulfoxide (DMSO) and triethyl phosphate (TEP), and the like, and as the poor solvent, it is possible to use ethylene glycol (EG), propylene glycol, diethyelene glycol (DEG), triethylene glycol (TEG), dipropylene glycol (DPG), gycerol, maleic anhydride, propylene-1,2-carbonate (PC), and the like, but examples thereof are not limited thereto.

The temperature of the internal coagulating solution and the phase-transition bath may be set to 0 to 80° C., and preferably to 10 to 50° C. When the temperature of the internal coagulating solution and the phase-transition bath is 10° C. or less, rapid cooling is effected, and thus, an extremely rapid solidification phenomenon occurs on the surface of the hollow fiber separation membrane, so that it is difficult to impart porosity of the hollow fiber separation membrane. When the temperature is more than 80° C., solidification extremely slowly occurs, and thus the crystal of the polymer is increased, and accordingly, there may be a problem in that the size of pores is increased, and the mechanical strength is weakened.

The polyvinylidene fluoride separation membrane thus cooled and solidified through the coagulation bath may pass through a washing bath to dissolve out the used solvent-based material, an unreacted photo curing agent, a photo initiator, or a hydrophilic polymer additive, and the like, and here, the photo hardened may be partially dissolved out by using a solvent, if necessary, thereby adjusting the porosity. In a preferred exemplary embodiment of The present invention, a stretching machine may be used as a method for increasing the mechanical strength of the hollow fiber separation membrane and increasing the net permeation flow rate, and for example, the rotation speed of a roll may be controlled by providing a wet heat stretching machine and a dry heat stretching machine. In the case of the wet heat stretching machine, water or steam may be used, and it is preferred that the temperature is maintained at 80 to 90° C. In addition, it is preferred that the stretching ratio is set to 1 time and 5 times.

Finally, a solidified and hydrophilized polyvinylidene fluoride separation membrane may be preferably manufactured by adding a drying process.

In The present invention, the hydrophilized hollow fiber separation membrane manufactured through the process has an average pore size of 0.01 to 0.1 μm, a net permeation flow rate of 150 to 1,200 L/m$^2$·hr (1 bar), and a porosity of 50% or more, and is excellent in membrane contamination resistance.

Another aspect of the present invention is to provide a method for manufacturing a hollow fiber membrane, in which the above-described method for hydrophilizing a separation membrane by a continuous process is applied to particularly a hydrophilized hollow fiber membrane having a three-layered structure, and here, the hollow fiber membrane having the peculiar three-layered structure means that (a) a dense sponge structure having a pore size of 0.001 to 0.05 μm, (b) a finger-like sponge structure, and (c) a sponge-bead mixed structure are formed in this order from the outermost surface thereof, and the method includes (i) supplying a polyvinylidene fluoride (PVDF)-based resin, a hydrophilic resin, a good solvent, a poor solvent, a curing agent, and a thermal initiator to an extruder; (ii) mixing and melting the supplied materials by temperature of a cylinder of the extruder and rotation of a screw; (iii) initiating the thermal initiator and polymerizing the thermal curing agent in a melt by using heat generated by temperature of the cylinder and rotation of the screw; and (iv) extruding and spinning the melt in which the thermal curing agent is being polymerized.

The hydrophilized hollow fiber membrane having a three-layered structure thus manufactured is excellent in mechanical strength and water permeability, and simultaneously has high performance which may remove even virus, and in order to achieve the object and effect of The present invention, the peculiar three-layered structure needs to be included.

The (a) dense structure formed on the outermost surface thereof is very dense and simultaneously has micropores having a size of 0.001 to 0.05 μm, preferably 0.001 to 0.02 μm, and thus, imparts ultra-membrane level high performance which may remove even virus to the hollow fiber membrane.

The dense sponge structure which serves the role may be formed to have a thickness of 0.01 μm to 50 μm in the hollow fiber membrane of The present invention, preferably a thickness of 0.01 μm to 20 μm.

(b) Next, the finger-like sponge structure provides macrovoids to the hollow fiber membrane of the present invention to reduce the passage resistance and increase the permeation flow rate, and as a result, also serves a role of imparting excellent water permeability characteristics. In an exemplary embodiment, the finger-like sponge structure may be formed to have a thickness of 10 μm to 100 μm.

(c) The sponge-bead mixed structure formed next to the finger-like sponge structure forms a structure in which beads are embedded while a 3-D network in the form of a sponge is entirely formed, and thus provides excellent high permeation performance, and simultaneously serves to provide high mechanical strength. According to an exemplary embodiment, the sponge-bead mixed structure is characterized in that the density of the bead structure becomes lower from the middle portion of the hollow fiber membrane to the internal coagulating solution.

Korean Patent Application No. 10-2012-0151027 describes the peculiar three-layered structure in more detail, the content of which is incorporated into the present specification by reference.

In order to manufacture a hydrophilized hollow fiber membrane having the peculiar three-layered structure, first, (i) supplying a polyvinylidene fluoride (PVDF)-based resin, a hydrophilic resin, a good solvent, a poor solvent, a curing agent, and a thermal initiator to an extruder is needed, and the description on the polyvinylidene fluoride (PVDF)-based resin, the hydrophilic resin, the curing agent, and the thermal initiator among the components is the same as that described above.

In the method of The present invention, the good solvent and poor solvent components may be together used to minimize the formation of a spherical structure by the spherulite, which is a typical result of the thermally induced phase separation, and as a result, the non-solvent inducement prevails on the surface portion of the separation membrane, thereby obtaining a pore size at the ultra-filtration membrane level, which has a very dense sponge structure on the outermost surface thereof. Furthermore, as a result, a partial spherical structure is formed therein as well as in the sponge, thereby providing excellent mechanical strength while reducing the passage resistance.

As the good solvent, it is possible to use dimethylformamide (DMF), n-methyl-2-pyrrolidone (NMP), dimethylacetamide (DMAc), dimethyl sulfoxide (DMSO) and triethyl phosphate (TEP), and the like, and as the poor solvent, it is possible to use ethylene glycol (EG), propylene glycol, diethyelene glycol (DEG), triethylene glycol (TEG), dipropylene glycol (DPG), gycerol, maleic anhydride, propylene-1,2-carbonate (PC), and the like, but examples thereof are not limited thereto.

In an exemplary embodiment, the poor solvent may be included in an amount of 30 to 70 wt % based on the good solvent, and when the ratio of the poor solvent is less than 30 wt %, solubility characteristics of the solvent composed of the phase separation good solvent-poor solvent are improved, and it may be difficult to form a base nucleus, and as a result, when a spherical structure is formed, the spherical structure is increased, so that a tendency that a separation membrane having large pores is manufacture may be increased. When the ratio of the poor solvent is 70% or more, solubility characteristics of the solvent becomes so low that it may be difficult to manufacture the separation membrane.

In a preferred exemplary embodiment, N-methyl 2-pyrrolidone (NMP) may be used as the good solvent, diethyelene glycol may be used as the poor solvent, and in this case, the content and weight percentage of each component to be included may be as follows.

| | |
|---|---|
| First Polymer (P1): Polyvinylidene fluoride-based resin (PVDF) | 20 to 40 wt % |
| Second Polymer (P2): Polyvinyl pyrrolidone (PVP) | 5 to 15 wt % |
| Third Polymer (P3): Polyethylene glycol (PEG) | 5 to 15 wt % |
| Good solvent: N-methyl-2-pyrrolidone (NMP) | 25 to 45 wt % |
| Poor solvent: Diethylene glycol (DEG) | 12 to 22 wt % |

In the composition, the polyvinylidene fluoride-based resin (PVDF) is included in an amount of 20 to 40 wt % in the total polymer solution, the second polymer and the third polymer are each included in an amount of 20 to 50 wt % based on the first polymer, the poor solvent is included in an amount of 30 to 70 wt % based on the good solvent. Meanwhile, a nucleating agent may be added to the mixed solvent of the first and second solvents, if necessary, and the amount of nucleating agent added may be less than 0.2 wt % based on the first polymer polyvinylidene fluoride-based resin.

Effects of the Present Invention

According to the method of the present invention, a thermal curing agent in the form of a monomer or an oligomer is added to a polymer solution, and in the melt state before a separation membrane is manufactured, thermal polymerization occurs due to an initial reaction of a thermal initiator at the appropriate temperature within a cylinder of the extruder. Thus, a hydrophilic component is evenly distributed into the membrane at the micro-level, and the hydrophilic component is not washed out, resulting in very high stability. Another advantage is high economic value and efficiency because the process for hydrophilizing the membrane as well as the process for manufacturing the membrane is carried out by the continuous process using the extruder without using conventional extrusion equipment in the form of an agitator.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

MODES FOR CARRYING OUT THE PREFERRED EMBODIMENTS

Hereinafter, the present invention will be described in more detail through the Examples. These Examples are provided only for more specifically describing The present invention, and it will be obvious to a person with ordinary skill in the art to which the present invention pertains that the scope of the present invention is not limited by these Examples according to the gist of The present invention.

EXAMPLE

Example 1

Manufacture of Hydrophilized High-Performance Ultra-Filtration Membrane Having Three-Layered Structure in which Micropores are Formed on Outermost Surface Thereof The mixture ratio was determined as 27 wt % of a polyvinylidene fluoride-based resin PVDF (Solvay, 6010 grade, and a molecular weight of 322 kDa), 37 wt % of 2-methyl-2-pyrrolidone (NMP), 18 wt % of diethyelene glycol (DEG), 9 wt % of polyvinyl pyrrolidone (PVP K30), and 9 wt % of polyethylene glycol (PEG 200). The polyvinylidene fluoride-based resin and polyvinyl pyrrolidone (PVP K30) were supplied to the hopper of the extruder, and NMP, DEG, and PEG were supplied through a liquid supply pump to the cylinder of the extruder. The temperature for regions 0 to 9 (C0 to C9) of the extruder was adjusted to 50° C. for C0 to C3, 120 to 140° C. for C4, 170 to 200° C. for C5 to C7, 150 to 170° C. for C8, and 120° C. for C9, and the temperature for up to the nozzle part was set 120° C.

The rotation speed of the screw was set as 300 rpm/min, and the materials mixed in the cylinder of the extruder was melt and extruded using a twin-screw extruder, finally spun through a gear pump and a nozzle, and entered into a coagulation bath. The outer diameter and inner diameter of the nozzle were each 2.0 mm and 1.2 mm, the distance between the nozzle and the coagulation bath was 50 mm, and as an internal coagulating solution, a mixture of (NMP: EG (ethylene glycol)=7:3) was used.

As a coagulation bath solution, deionized water (DI) was used, and the temperature of the coagulating solution was set to room temperature (20° C.). A hollow fiber separation membrane product of the present invention was manufactured by extracting the hollow fiber membrane which had passed through the coagulation bath in a washing bath one overnight or more, and then drying the hollow fiber membrane at room temperature.

Physical properties of the separation membrane manufactured by the above method are shown in the following Table 1, and as a result of experiment, the separation membrane manufactured in Example 1 was excellent in mechanical strength, such as a tensile strength of 2.5 Mpa and an elongation rate of 20%. The pore size was inferred as 0.01 µm by obtaining 100% removal rate of PEO 100,000 using a molecular weight cut off (MWCO) method, and it was confirmed that the separation membrane was a ultra-filtration membrane having a net permeation flow rate of 228 L/m²·hr and a porosity of 59% at 1 bar and 25° C.

Figure 1:
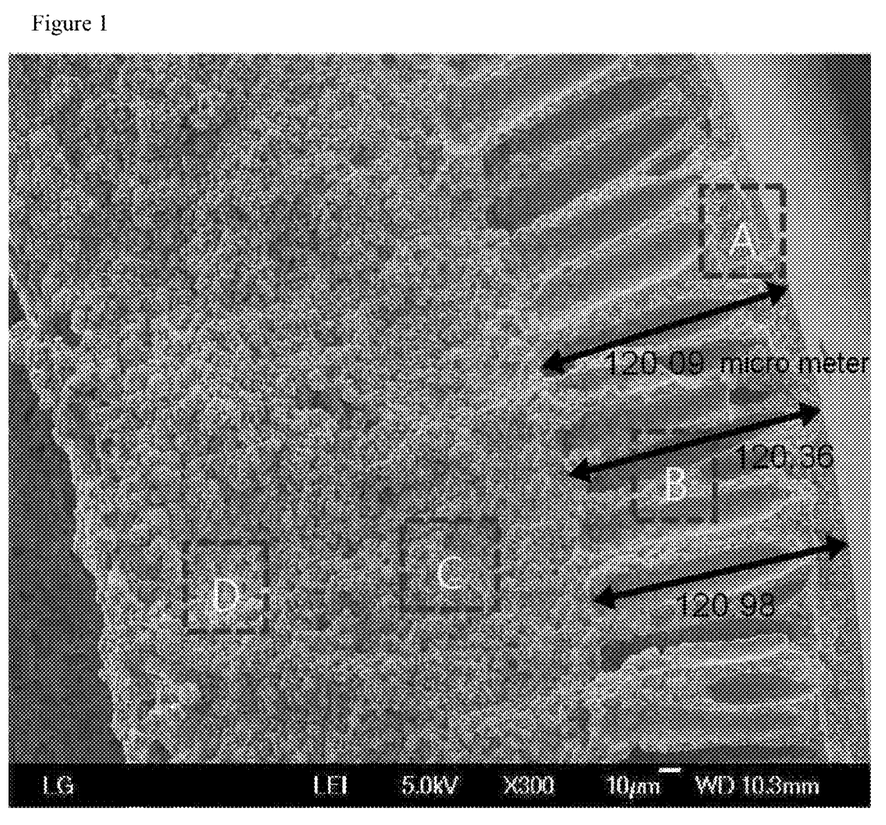
FIG. 1 is a scanning electron microscope (SEM) photograph illustrating a cross-section of a separation membrane manufactured in Example 1.
Figure 2:
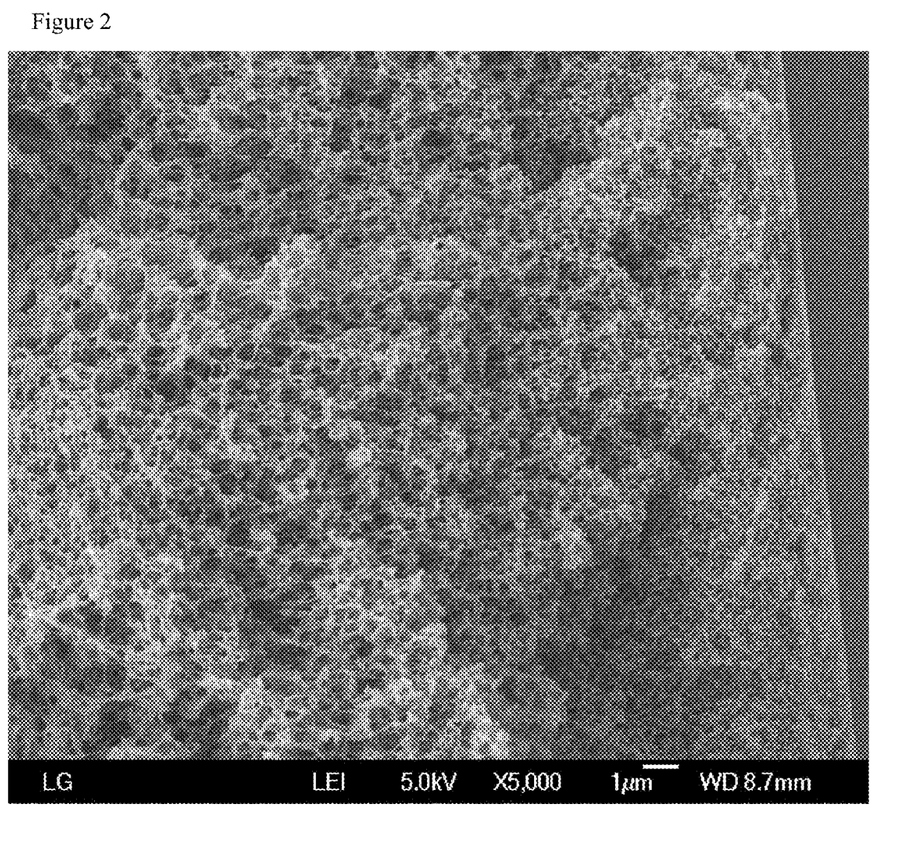
FIG. 2 is a magnification of the cross-section (Region A in FIG. 1) of the outermost surface portion of the manufactured separation membrane. It can be confirmed that the size of pores formed on the outermost surface thereof is 0.01 μm or less.
Figure 3:
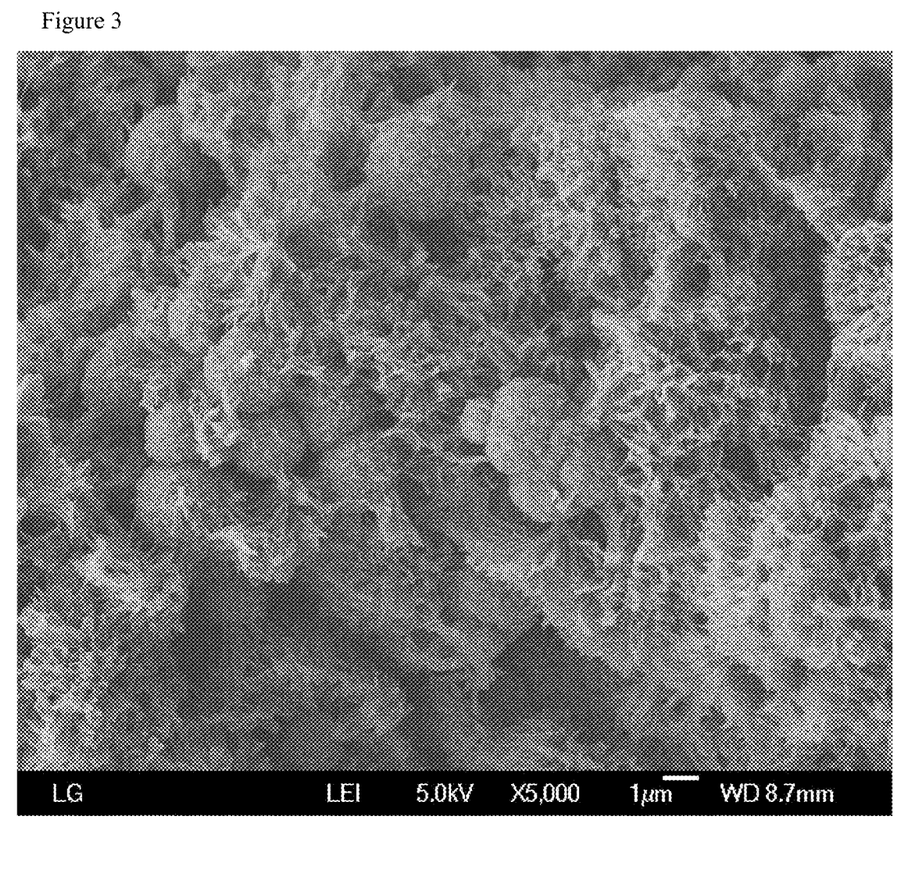
FIG. 3 is a magnification of Region C in FIG. 1, and it is confirmed that there is a structure in which sponges and beads (spherulite) are mixed together.
Figure 4:
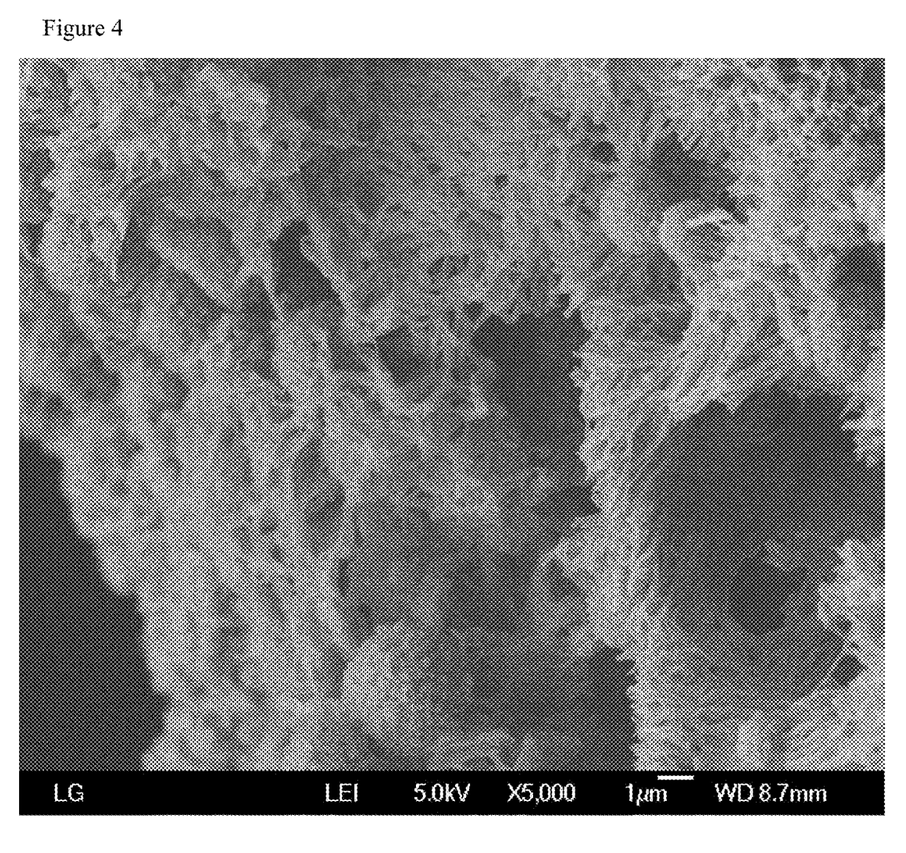
FIG. 4 is a magnification of Region D in FIG. 1, and it can be confirmed that a structure in which sponges and beads are also mixed together is formed, but the structure has a density lower than that of the bead structure in FIG. 3.
Figure 5:
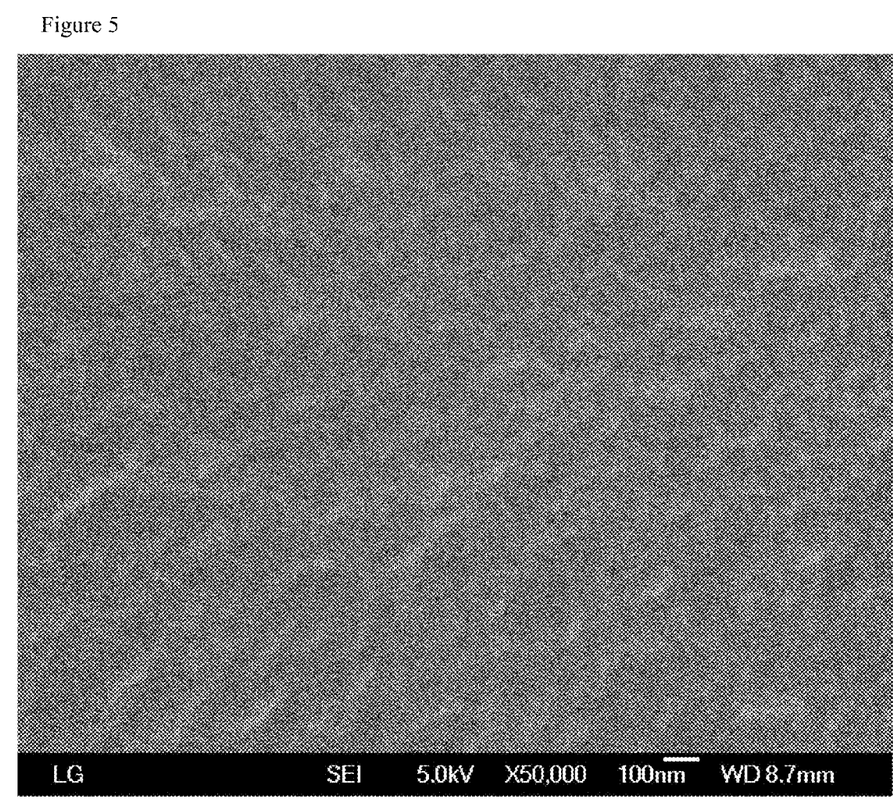
FIG. 5 is a scanning electron microscope photograph observing the outermost surface of the separation membrane.
Figure 6:
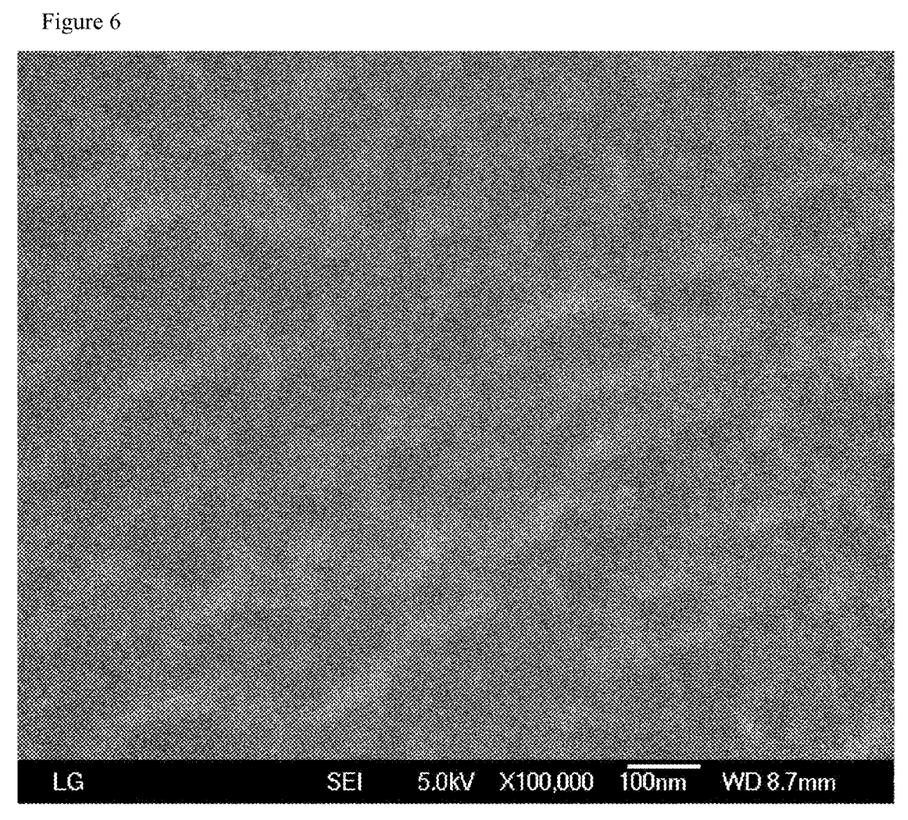
FIG. 6 is a further magnification of this. The size of pores formed is 0.01 μm or less.

In order to more exactly confirm the membrane thickness, void size, and cross-section and surface state of the hollow fiber separation membrane manufactured by the method, observation by a scanning electron microscope (SEM) was performed, and the result is shown in FIG. 1. The PVDF hollow fiber separation membrane manufactured by the above method exhibited an outer diameter in a range of 1 to 1.2 mm and an inner diameter of 0.5 to 0.8 mm. The cross-sectional structure was as follows: a very dense sponge structure was formed in the outermost part of the separate membrane; next to the sponge structure, macrovoids with finger-like sponge structure was formed; and inside part of the separate membrane, a spherical spherulite structure was partially observed but it was minimized, and an interpenetrating network structure was principally formed. It was confirmed that the outermost surface of the separation membrane had a pore size of 0.01 µm or even smaller, and in particular, the closer to the surface of the separate membrane, the much denser structure was observed.

Example 2

Manufacture of High-Performance Ultra-Filtration Membrane Having Extra Hydrophilicity by Continuous Process (First Hydrophilization Manufacturing Method)

A separate membrane was prepared in the same way as explained in Example 1, except that a thermal curing process was performed in an extruder using 10 wt % of 2-hydroxy ethyl acrylate (HEA)/triethylene glycol diacrylate (TEGDA) as a curing material (thermal curing agent) based on the polymer solution, and 5 wt % of diisopropyl diazene as a thermal initiator based on the thermal curing agent. Specifically, the thermal initiator was initiated by heat generated from the temperature of the cylinder and rotation of the screw, and thereby monomers which are curing materials were polymerized to form a hydrophilic network.

With respect to the separation membrane manufactured by the above method, the time for which the flux is reduced to 50% level as compared to the initial flux was measured by using bovine serum albumin (BAS) as a contaminant. As a result, it was observed that the flux reduction rate was slower than that of Example 1, which shows the hydrophilic effect and the improved contamination resistance.

Example 3

Manufacture of High-Performance Ultra-Filtration Membrane Having Extra Hydrophilicity by Continuous Process (Second Hydrophilization Manufacturing Method)

The mixture ratio was determined as 27 wt % of a polyvinylidene fluoride-based resin PVDF (a molecular weight of 322,000), 37 wt % of N-methyl-2-pyrrolidone (NMP), 18 wt % of diethyelene glycol (DEG), 9 wt % of polyvinyl pyrrolidone, and 9 wt % of polyethylene oxide (a molecular weight of 100,000). A separate membrane was prepared in the same way as explained in Example 1, except that 10 wt % 2-hydroxy methacrylate (HEMA) was used as a curing material (thermal curing agent) based on the polymer solution and 5 wt % of diisopropyl diazene was used as a thermal initiator based on the thermal curing agent, and the monomers (curing material) were adhered to the polyethylene oxide chain and graft-polymerized by heat generated from temperature of the cylinder and rotation of the screw in the extruder. Specifically, the temperature of the extruder was adjusted to 50° C. to 170° C., and the temperature for up to the nozzle part was set to 120° C. The rotation speed of the screw was 300 rpm/min, and the materials mixed in the cylinder of the extruder was melt and extruded from a twin-screw extruder, finally spun through a gear pump and a nozzle, and entered into a coagulation bath. The outer diameter and inner diameter of the nozzle were each 2.0 mm and 1.2 mm, and as an internal coagulating solution, a mixture (NMP:EG (ethylene glycol)=7:3) was used. The other manufacturing processes are the same as in Example 1.

Basic physical properties measured with respect to the separation membranes manufactured in Examples 1 to 3 are summarized in the following Table 1, the content of each constituting component of the present invention is not limited to the numerical values described in Table 1, and those with ordinary skill in the art may conduct rational summary and reasoning based on the numerical range in the Table. The parameters in Table 1 are only one of the exemplary embodiments of the present invention, and should not be interpreted as the essential condition of the present invention.

TABLE 1

| No. of Example | | 1 | 2 | 3 |
|---|---|---|---|---|
| Ratio of polymer solution component | PVDF (wt %) | 27 | 27 | 27 |
| | PVP (wt %) | 9 | 9 | 9 |
| | PEG/PEO (wt %) | 9 | 9 | 9 |
| | NMP (wt %) | 37 | 37 | 37 |
| | DEG (wt %) | 18 | 18 | 18 |
| Thermal curing agent | HEA/TEGDA (wt %, as compared to the polymer solution) | | 10 | |
| Thermal curing agent | HEMA (wt %, as compared to the polymer solution) | | | 10 |
| Thermal initiator | Diisopropyl diazene (wt %, as compared to the thermal curing agent) | | 5 | 5 |
| Temperature (° C.) of the polymer solution | | 120 | 120 | 140 |
| Air gap (mm) | | 50 | 50 | 50 |
| Constitution of the cooling solution | Water (%) | 100 | 100 | 100 |
| Cooling temperature (° C.) | | 20 | 20 | 20 |
| Net permeation flow rate (L/m · 2 h) | | 228 | 190 | 215 |
| Reduction in flux by resistance to contamination (min) @J/J0 = 50%, concentration of BSA (50 mg/L) | | 50 | 59 | 62 |

The invention claimed is:

1. A method of manufacturing a hydrophilized hollow fiber membrane by a continuous process using an extruder, the method comprising:
   (i) supplying a polyvinylidene fluoride (PVDF)-based resin, a hydrophilic resin, a thermal curing agent, and a thermal initiator to an extruder;
   (ii) mixing and melting the supplied materials to a melt by temperature of a cylinder and rotation of a screw of the extruder;
   (iii) polymerizing the thermal curing agent in the melt, wherein the polymerization begins by initiating the thermal initiator using heat generated from temperature of the cylinder and rotation of the screw; and
   (iv) extruding and spinning the melt in which the thermal curing agent is being polymerized.

2. The method of claim 1, wherein the hydrophilic resin is selected from the group consisting of polyvinyl pyrrolidone (PVP), polyethylene glycol (PEG), an acrylamide resin, an acryl-based resin, an amine-based resin, polyetherimide (PEI), polyimide (PI), polyamide (PA), and cellulose acetate (CA).

3. The method of claim 1, wherein the thermal curing agent in the step (iii) is polymerized in the melt to form a polymerization network with each other.

4. The method of claim 1, wherein the thermal curing agent in the step (iii) is adhered to the polyvinylidene fluoride (PVDF)-based resin or the hydrophilic resin and graft-polymerized in the melt.

5. The method of claim 1, wherein the temperature of the cylinder is adjusted to 50 to 250° C.

6. The method of claim 1, wherein the rotation speed of the screw is adjusted to 150 to 300 rpm.

7. The method of claim 1, wherein the melt in step (iv) is extruded together with an internal coagulating solution.

8. A method of manufacturing a hydrophilized hollow fiber membrane by a continuous process using an extruder, the hollow fiber membrane in which (a) a dense sponge structure having pores with a size of 0.001 to 0.05 μm, (b) a finger-like sponge structure, and (c) a sponge-bead mixed structure are formed in the order mentioned from the outermost surface of the membrane,
the method comprising: (i) supplying a polyvinylidene fluoride (PVDF)-based resin, a hydrophilic resin, a good solvent, a poor solvent, a thermal curing agent, and a thermal initiator to an extruder;
   (ii) mixing and melting the supplied materials to a melt by temperature of a cylinder and rotation of a screw of the extruder;
   (iii) polymerizing the thermal curing agent in the melt, wherein the polymerization begins by initiating the thermal initiator using heat generated from temperature of the cylinder and rotation of the screw; and
   (iv) extruding and spinning the melt in which the thermal curing agent is being polymerized.

9. The method of claim 8, wherein the size of pores formed on the outermost surface of the membrane is 0.001 to 0.01 μm.

10. The method of claim 8, wherein the dense sponge structure has a thickness of 0.01 to 20 μm, the finger-like sponge structure has a thickness of 10 to 10 μm, and the sponge-bead mixed structure has a thickness of 50 to 200 μm.

11. The method of claim 8, wherein the density of the beads contained in the sponge-bead mixed structure (c) is gradually reduced from the central part to the internal coagulant-contacting part of the membrane.

12. The method of claim 8, wherein the hollow fiber membrane has an ability to remove virus.

* * * * *